UNITED STATES PATENT OFFICE.

GEORGE W. SCOLLAY, OF NEW YORK, N. Y.

PROCESS OF TREATING ORES.

SPECIFICATION forming part of Letters Patent No. 333,785, dated January 5, 1886.

Application filed July 8, 1885. Serial No. 171,017. (No specimens.)

*To all whom it may concern:*

Be it known that I, GEORGE W. SCOLLAY, a citizen of the United States, residing in the city, county, and State of New York, have invented certain new and useful improvements in processes of treating ores and other matter or material with which precious metals are united or associated, for the purpose of separating them from such associated matter, and for the purpose of alloying or uniting them with iron as a step in the process of ultimately collecting and saving them; and I do hereby declare the following to be such a full, clear, and exact description of my said invention as will enable any one skilled in the art to which it appertains or is most nearly connected to work or practice the same.

The object of my invention is to supply a more effectual and economical process of separating and collecting the precious metals from the gangue or other foreign matter with which they may happen to be associated; and my invention consists of a novel process of treating the ores and other matter or material with which such precious metals are associated, and by which they are separated from the ore and alloyed or united with iron preparatory to their final separation and collection.

My process is as follows:

First. Reduce the ore or other matter to be treated as nearly as possible to an impalpable powder by any of the well-known methods of grinding or stamping ores or similar substances.

Second. Reduce iron, also, by any of the well-known methods or machines to an impalpable powder as nearly as possible.

Third. Mix the pulverized ore and iron together in the proportion of one pound of the ore to from one-half ounce to three half-ounces of the iron, the proportion of iron used by me and with which I obtain good results being one and a quarter ounce of iron to one pound of ore, mixing the two thoroughly to insure as perfect a contact of the pulverized iron with the pulverized ore throughout the mass as possible.

Fourth. Pass the charge thus prepared through a suitably fine mesh—say a sixty-mesh—sieve and put it into a suitable covered crucible.

Fifth. Put the crucible into a suitable furnace and raise the temperature to from 2700° to 2800° of Fahrenheit, or to the fusing-point of the iron used, and maintain it at that temperature, as nearly as possible, from thirty to fifty minutes. The effect of this treatment is to fuse the precious metal and the iron and to unite them together, forming an alloy of the iron and precious metal, the metals having such an affinity for each other as to cause them to unite in the form of an alloy as soon as the precious metal fuses and separates from the gangue or foreign matter, the iron maintaining its granular or molecular form and taking up the precious metal contained in the ore. The contents of the crucible, when taken from the furnace, consists of the metals in the form of a granular alloy and the gangue in a coked state, the granular alloy forming and remaining through the entire mass of the coked gangue, or wherever the two metals happen to be together in the pulverant, there being no precipitation of the alloy in the crucible, the whole charge remaining in a friable condition, the granular alloy being mixed through it and readily removable from the crucible without injury to the latter.

Sixth. After removing the charge from the crucible crush it sufficiently to liberate the granular alloy from the slag or coked gangue by any suitable means now in use for such purposes.

Seventh. Separate the gangue or other foreign matter from the alloy of iron and precious metal either by washing with water or by the attraction of a magnet suitably adapted for the purpose.

Eighth. Separate the precious metal from the iron by any of the methods now well known for that purpose. In case the percentage of precious metal with the iron resulting from the charge is small the alloy of iron and precious metal may be repulverized or used without pulverizing, as the case may require, and used in a second or even a third charge as a substitute for the iron with good result.

This invention does not extend beyond the production of the precious metal combined with the iron in the form of a granular alloy, as above stated, as in that case it is a marketable product; but the iron is readily separated from the precious metal by the ordinary method of oxidation and vanning or amalgamation. This method is especially valuable for low-grade ores, and those containing sulphur in combination with the precious metals, as it avoids entirely the treatment of the ores for the purpose of desulphurizing them. By this process of obtaining the precious metals it is immaterial whether the ore contains little or much sulphur, the excess (above a protosulphide) being driven off by the heat used in obtaining the alloy, the real essence of the invention consisting in obtaining the precious metals by alloying them with iron or any suitable substitute for iron in a granular form through the gangue by the agency of heat alone, and without the aid of any other chemical action or reaction than such as results from the application of heat to the mixture of pulverized ore and pulverized iron, the elimination of the impurities of the ore being a mere incident and not at all the object of the invention, the point being to alloy the precious metal with the iron in a granular form through the entire mass of coked gangue, avoiding vitrification and precipitation in the crucible.

In the practice of this process I prefer to use the white brittle cast iron, this being considered a true carburet of iron; but as a substitute for this carburet of iron I may use steel or any equivalent for carburet of iron, which performs substantially the same results in substantially the same way. This method is styled by me "the dry or coking process," and the numerous experiments I have made with it during the past year to test its practicability and applicability to various kinds of ores, sands, and substances carrying or containing the precious metal show such uniform results as to justify its application to all ores containing gold and silver, and by the experiments above alluded to I have demonstrated that gold and silver when contained in the same ore are practically all obtained in the alloy without any other preparation or treatment of the ores than mere pulverization.

Having now described my process of obtaining the precious metals from their associated gangue, before stating the features of novelty claimed as my invention I observe that I am familiar with the various processes heretofore employed for the purpose of eliminating the sulphur and other impurities contained in the ores, and I have especially considered the methods described in the United States Patent No. 25,320, to De Bronac and Diherrypon; also No. 7,670, to McColloh; also, No. 78,831 to Rivot; also No. 83,582, to Kidwell, and also No. 125,835, to Nes; but none of these patents describe or suggest my invention.

The object and effect of the invention described in each and all of these patents is to desulphurize and eliminate other impurities contained in the ore, and they all employ chemical actions and reactions not used in my process.

None of these inventions have for their object the obtaining of the precious metal from the ore by alloying or uniting it with iron in a granular form by the mere application of heat applied directly to the ore and iron in the form of a combined pulverant, and none of them obtain as a result an alloy consisting of iron and the precious metal of the ore treated in a granular form, a result which it is exactly the object of my invention to obtain, whether the ore contains much or little precious metal, and without reference to any impurities it may contain, the alloy being obtained without any previous preparation of the ore beyond its mere pulverization and admixture with the iron pulverant and by the direct application of heat. If the ore treated should contain in its natural state enough earthy alkalis or other ingredients to cause the gangue to flux and vitrify when raised to the temperature required in the process, a small percentage of carbon or other similar substance, infusible at the temperature of the process, should be added to prevent the fluxing.

In this specification the expression "precious metal" is intended to include gold and silver only, and the word "alloy" is used for want of a better expression to describe the union that takes place between the iron and the precious metals, which, if the iron be pure, is an alloy; but if the iron contains impurities—such as sulphur—it is an agglomerate; but whether the granules be an alloy or an agglomerate the result is the same, the object being to unite the iron and the precious metals in a granular form through the mass of coked gangue, and whether the granules be an alloy or an agglomerate is not material.

I claim, therefore, and desire to secure by Letters Patent—

The process, substantially herein described, of obtaining precious metals from the ores containing them, which process consists of first mixing together pulverized ore and pulverized iron in suitable proportions, as above set forth, and of then fusing the metals contained in the combined pulverant, causing them to form an alloy or a conglomerate in a granular form through the gangue by the mere application of heat thereto, driving off the sulphur in excess of a protosulphide and similar impurities of the ore, if any, as an incident of the process.

GEO. W. SCOLLAY.

Witnesses:
AMOS BROADNAX,
J. EDGAR BULL.